United States Patent [19]

Shibata et al.

[11] 3,780,215

[45] Dec. 18, 1973

[54] CIRCUIT FOR COMPENSATING SHARPNESS OF PICTURE IN COLOR TELEVISION RECEIVER

[75] Inventors: Akira Shibata, Higashi-Koganei; Masanori Oguino, Tokyo, both of Japan

[73] Assignee: Hitachi, Ltd., Tokyo, Japan

[22] Filed: Nov. 17, 1970

[21] Appl. No.: 90,404

[30] Foreign Application Priority Data

Nov. 24, 1969 Japan ................................ 44/93584

[52] U.S. Cl. 178/5.4 R, 178/DIG. 25, 178/DIG. 34

[51] Int. Cl. ........................... H04n 9/00, H04n 5/14

[58] Field of Search .................. 178/5.4 R, DIG. 25, 178/DIG. 34, 6.8, 7.2, DIG. 3; 325/4 G

[56] References Cited

UNITED STATES PATENTS

| | | | |
|---|---|---|---|
| 3,647,943 | 3/1972 | Marshall | 178/5.4 CD |
| 2,850,574 | 9/1958 | Kretzmer | 178/DIG. 3 |
| 3,117,278 | 1/1964 | Johnson | 325/346 |
| 3,034,069 | 5/1962 | Fathauer | 178/DIG. 25 |
| 2,939,910 | 6/1960 | Blake | 178/DIG. 25 |
| 2,851,522 | 9/1958 | Hollywood | 178/DIG. 25 |
| 2,853,548 | 9/1958 | Espenlaub | 178/5.4 R |

*Primary Examiner*—Robert L. Richardson
*Assistant Examiner*—George G. Stellar
*Attorney*—Craig, Antonelli, Stewart & Hill

[57] ABSTRACT

A circuit for compensating the sharpness of the picture in a color television receiver comprising a delay circuit and a low-pass filter applied respectively with the luminance signal in a video signal, and a subtractor connected to the delay circuit and the low-pass filter to receive the respective outputs from them whereby to impart a preshoot and an overshoot to the luminance signal.

1 Claim, 32 Drawing Figures

INVENTORS
AKIRA SHIBATA
MASANORI OGUINO
BY Craig, Antonelli, Stewart & Hill
ATTORNEYS

INVENTORS

AKIRA SHIBATA
MASANORI OGUINO

BY Craig, Antonelli, Stewart & Hill
ATTORNEYS

INVENTORS

AKIRA SHIBATA
MASANORI OGUINO

BY Craig, Antonelli, Stewart & Hill
ATTORNEYS

INVENTORS

AKIRA SHIBATA
MASANORI OGUINO

BY Craig, Antonelli, Stewart + Hill
ATTORNEYS

INVENTORS

AKIRA SHIBATA
MASANORI OGUINO

BY Craig, Antonelli, Stewart & Hill
ATTORNEYS

INVENTOR

AKIRA SHIBATA
MASANORI OGUINO

BY Craig, Antonelli, Stewart & Hill
ATTORNEYS

INVENTOR

AKIRA SHIBATA
MASANORI OGUINO

BY Craig, Antonelli, Stewart & Hill
ATTORNEYS

INVENTOR
AKIRA SHIBATA
MASANORI OGUINO
BY Craig, Antonelli, Stewart & Hill
ATTORNEYS INVENTOR
AKIRA SHIBATA
MASANORI OGUINO
BY Craig, Antonelli, Stewart & Hill
ATTORNEYS INVENTOR
AKIRA SHIBATA
MASANORI OGUINO
BY Craig, Antonelli, Stewart & Hill
ATTORNEYS

CIRCUIT FOR COMPENSATING SHARPNESS OF PICTURE IN COLOR TELEVISION RECEIVER

BACKGROUND OF THE INVENTION

1. Field of the Invention

This invention relates to circuits for compensating the sharpness of the picture in a color television receiver, and more particularly to a circuit of the kind above described which comprises means for imparting a preshoot and an overshoot to the waveform of the luminance signal applied to a color television receiver so as to improve the sharpness of the contour of the picture.

2. Description of the Prior Art

Conventional color television receivers have employed means such as a capacitor connected in parallel with an emitter resistor for a transistor disposed in the last stage of the video amplifier for raising an edge of the high frequency portion in the waveform of the luminance signal, hence imparting a so-called overshoot to the signal waveform so as thereby to improve the sharpness of the picture reproduced on the television receiver. While this arrangement can satisfactorily improve the sharpness of the picture, a large overshoot is generally required to obtain a sufficient sharpness. However, the impartation of such a large overshoot results in the blooming at the picture portion imparted with the overshoot and adversely affects the picture quality. Therefore, a sufficient sharpness cannot be obtained since the impartation of a sufficiently large overshoot to the signal waveform is objectionable. Further, a good picture quality cannot be obtained due to the fact that the rear edge of the signal waveform can merely be intensified.

It is known that such a defect can be overcome by a method according to which the front edge of the waveform of the luminance signal is raised, hence a so-called preshoot is imparted to the signal waveform in addition to the impartation of the overshoot to the signal waveform. However, a practical circuit embodying this method has not been realized yet.

SUMMARY OF THE INVENTION

It is an object of the present invention to provide a circuit for compensating the sharpness of the picture in a color television receiver which can simply impart a reshoot and overshoot to the waveform of the luminance signal in a video signal.

Another object of the present invention is to provide a circuit for compensating the sharpness of the picture in a color television receiver in which the magnitude of the preshoot and overshoot is easily adjustable.

In accordance with one aspect of the present invention, there is provided a circuit for compensating the sharpness of the picture in a color television receiver which comprises a delay circuit and a low-pass filter applied respectively with the luminance signal in a video signal, and a subtractor connected to said delay circuit and said low-pass filter to receive the respective outputs therefrom so that the luminance signal appearing at the output of said subtractor can be imparted with a preshoot and an overshoot of desired magnitude.

DESCRIPTION OF THE PREFERRED EMBODIMENTS

Figure 1:
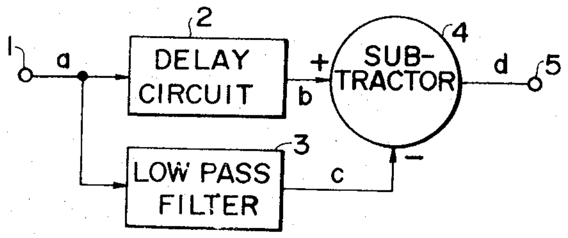
FIG. 1 is a block diagram illustrating one basic structure of the present invention.

Referring to FIG. 1 showing one basic structure of a circuit for compensating the sharpness of the picture in a color television receiver according to the present invention, it includes an input terminal 1, a delay circuit 2, a low-pass filter 3, a subtractor 4, and an output terminal 5.

Figure 2:
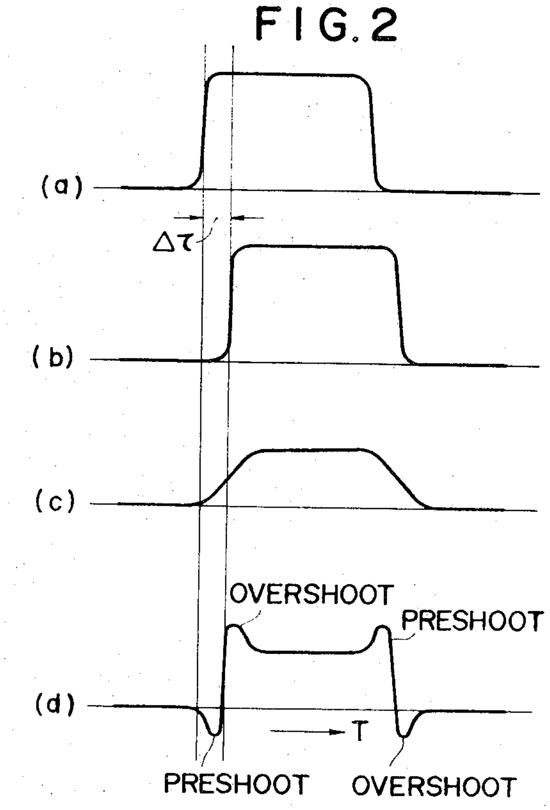
FIGS. 2*a* through 2*d* show voltage waveforms appearing at various parts of the circuit shown in FIG. 1.

The operation of the circuit having the above structure will be described with reference to FIGS. 2*a* through 2*d*. A video signal having a waveform as shown in FIG. 2*a* is applied from the input terminal 1 to both the delay circuit 2 and the low-pass filter 3. The output delivered from the delay circuit 2 in response to the application of the video signal has a waveform as shown in FIG. 2*b* in which it will be seen that the output waveform is delayed relative to the input waveform by a delay time $\Delta\tau$ of the delay circuit 2, while the output delivered from the low-pass filter 3 has a waveform as shown in FIG. 2*c* in which it will be seen that the high frequency portion of the input waveform is removed by the filter 3. The delay time of the low-pass filter 3 is selected to be substantially equal to the delay time $\Delta\tau$ of the delay circuit 2. The outputs from the delay circuit 2 and the low-pass filter 3 are applied to the subtractor 4 wherein the output from the low-pass filter 3 is subtracted from the output from the delay circuit 2 so that a signal waveform imparted with preshoots and overshoots as shown in FIG. 2*d* appears at the output terminal 5. While the signal waveform shown in FIG. 2*d* has symmetrical preshoots and overshoots, the magnitude of the preshoot and overshoot may be suitably varied by varying the time constant or delay time of the low-pass filter 3, and when so required, the preshoot may be solely imparted to the signal waveform.

In the arrangement shown in FIG. 1, the delay circuit 2 may be one which is commonly employed in a color television receiver. In a color television receiver, the luminance signal and the chrominance signal are transmitted through different transmission paths resulting in a time difference between these two signals, and this time difference is compensated by a delay circuit having a delay time of the order of 1 μsec interposed in the transmission path for the luminance signal. This delay circuit may be conveniently utilized as the delay circuit 2 shown in FIG. 1, thereby eliminating the need for the provision of a separate delay circuit which is expensive and realizing an economical sharpness compensating circuit of great industrial value. The magnitude of the preshoot and overshoot imparted to the video signal in this manner, hence the degree of intensification of the contour can be suitably controlled by adjusting the attenuation characteristic of the low-pass filter, that is, the relative magnitude of the level of the output from the low-pass filter. A good picture quality can be obtained by selecting the magnitude of the preshoot and overshoot so that it is about 20 percent of the amplitude of the signal waveform.

Figure 3:
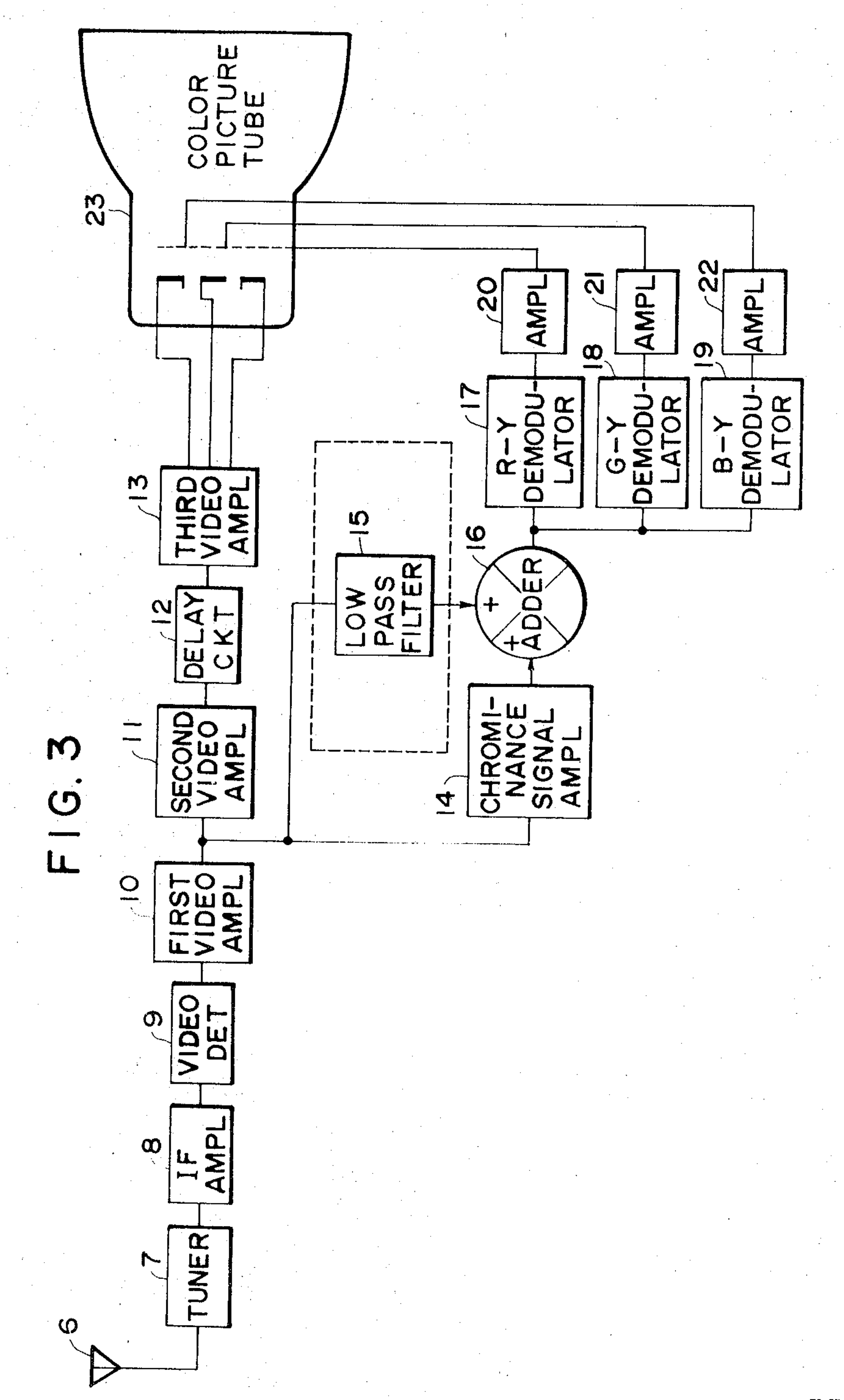
FIG. 3 is a block diagram of an embodiment of the present invention.

Referring to FIG. 3 showing a block diagram of an embodiment of the present invention, a television signal received by an antenna 6 is tuned and amplified by a tuner 7 and is then subjected to frequency conversion and amplification by an IF amplifier 8. The amplified IF signal is converted into a video signal by a video detector 9 and the video signal is amplified by a first video amplifier 10. The luminance signal component in the amplified video signal is amplified and delayed by being passed through a second video amplifier 11, a delay circuit 12 and a third video amplifier 13. The function of the delay circuit 12 is to delay the luminance signal so that the luminance signal and the chrominance signal have a substantially equal delay time. The luminance signal is finally applied to the respective cathodes of three electron guns for red (R), green (G) and blue (B) disposed in a color picture tube 23. The output from the first video amplifier 10 is applied also to a chrominance signal amplifier 14 and a low-pass filter 15. The chrominance signal component in the video signal is separated from the luminance signal component by the chrominance signal amplifier 14 to be applied to an adder 16, while at the same time, the low frequency portion of the luminance signal component in the video signal is separated from the high frequency portion to be applied to the adder 16 so that these two signals are combined with each other in the adder 16. The chrominance signal in the composite signal delivered from the adder 16 is demodulated by an R-Y demodulator 17 (Y: luminance signal), a G-Y demodulator 18 and a B-Y demodulator 19 into an R-Y, a B-Y and a G-Y signal or color difference signals, respectively. The color difference signals are then amplified by respective amplifiers 20, 21 and 22 to be applied to the respective grids of the electron guns in the color picture tube 23. The low frequency portion of the luminance signal component in the composite signal is applied to the grids after being merely amplified.

The luminance signal exciting the cathodes of the color picture tube 23 is merely subjected to the amplification and delay and the band width of the luminance signal circuit lies in the range of 3 to 4 MHz. Therefore, when the luminance signal applied to the second video amplifier 11 has a waveform as shown in FIG. 2*a*, the luminance signal applied to the cathode is delayed by the delay time $\Delta\tau$ of the delay circuit 12 and has a waveform as shown in FIG. 2*b*. On the other hand, the cut-off frequency of the low-pass filter 15 is of the order of 500 kHz and thus its output has a waveform as shown in FIG. 2*c*. This signal is applied to the grid without any change in its waveform because the demodulators 17, 18, 19 and the amplifiers 20, 21, 22 act merely as a 500 kHz low-pass filter and amplifier with respect to this signal. In the color picture tube 23, the matrix circuit of the cathodes and grids produces a signal (FIG. 2*d*) representing the difference between the cathode exciting signal (FIG. 2*b*) and the grid exciting signal (FIG. 2*c*), and this difference signal modulates the electron beam so that a picture having a balanced preshoot and overshoot can be produced on the screen.

Figure 4:
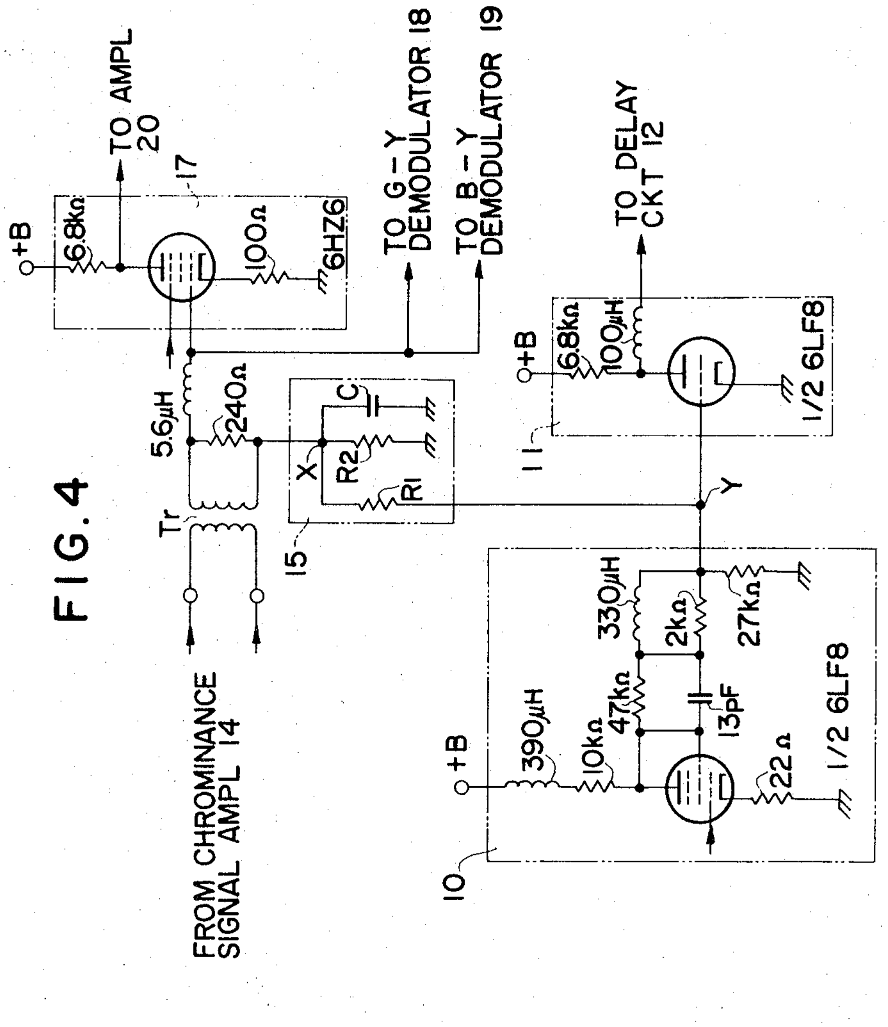
FIG. 4 is a practical circuit diagram of parts of the circuit shown in FIG. 3.

FIG. 4 shows a practical structure of parts of the circuit shown in FIG. 3. According to the structure of the present invention shown in FIG. 4, the output of the first video amplifier 10 disposed in the circuit of a conventional color television receiver is branched at a point Y so that the output signal can be applied through the low-pass filter 15 to the first grid of each of the R-Y, G-Y and B-Y demodulators 17, 18 and 19. The point X at the secondary side of a transformer Tr in FIG. 4 has been grounded in the conventional color television receiver, but according to the present invention, a resistor $R_2$ and a capacitor C are connected in parallel between the point X and ground as shown. The signal appearing at the output of the first video amplifier 10 is applied by way of the branch line to the point X through a resistor $R_1$. The resistors $R_1$, $R_2$ and the capacitor C constitute the low-pass filter 15 which has a cut-off frequency of the order of 500 kHz. Thus, the frequency of the output signal delivered from the first video amplifier 10 is limited to about 500 kHz by the low-pass filter 15 and is then applied to the R-Y, B-Y and G-Y demodulators 17, 18 and 19. While, in FIG. 4, the output signal of the first video amplifier 10 has been applied through the low-pass filter 15 to the first grid of each of the R-Y, B-Y and G-Y demodulators 17, 18 and 19 to be superposed on the chrominance signal delivered from the chrominance signal amplifier 14, the output signal of the first video amplifier 10 may be applied through the low-pass filter 15 to the third grid of each of the demodulators 17, 18 and 19 to be superposed on the demodulating signal of 3.58 MHz.

Figure 5:
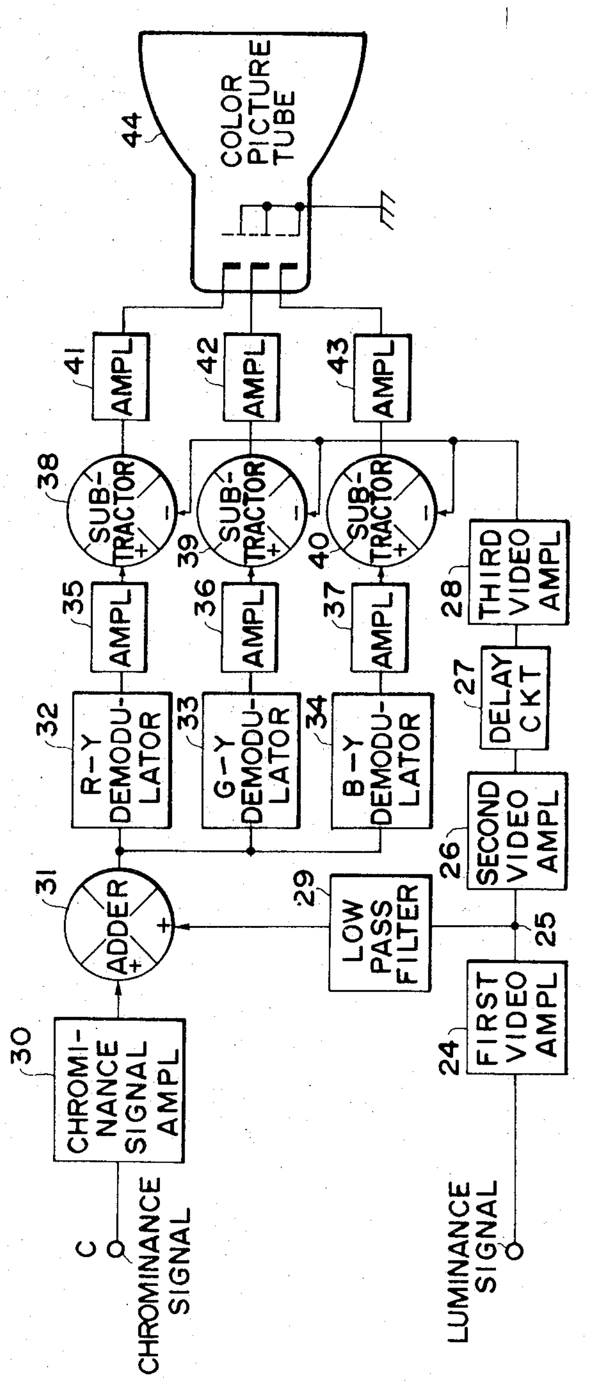
FIG. 5 is a block diagram of another embodiment of the present invention.

FIG. 5 shows another embodiment of the present invention in which parts related to the present invention are only shown in a block diagram. This embodiment relates to a sharpness compensating circuit for a color television receiver of the three primary color system employing a transistor matrix and R-Y, G-Y and B-Y demodulators using diodes.

The luminance signal is amplified by a first video amplifier 24 to appear at a point 25 to be transmitted along two different paths. The luminance signal following one of the paths is amplified further by a second video amplifier 26 to be applied to a delay circuit 27. In the delay circuit 27, the luminance signal is delayed so that its delay time is substantially in accord with the delay time of the chrominance signal, and is then amplified by a third video amplifier 28. The third video amplifier 28 is of the emitter follower type so that the output signal of the third video amplifier 28 has a polarity opposite to that of the signal appearing at the point 25. On the other hand, the luminance signal following the other path is applied to a low-pass filter 29 so that its frequency is limited to about 500 kHz. The latter luminance signal is combined in an adder 31 with the chrominance signal amplified by a chrominance signal amplifier 30. The composite signal is applied to an R-Y, a G-Y and a B-Y diode demodulator 32, 33 and 34 so that the chrominance signal is demodulated into an R-Y, a G-Y and a B-Y signal, respectively, while the luminance signal having been subjected to the frequency limitation is merely slightly attenuated. Thus, the frequency-limited luminance signal is superposed on the R-Y, G-Y and B-Y signals and the resultant signals appear at the output of the respective diode demodulators 32, 33 and 34. These signals are amplified by respective color difference signal amplifiers 35, 36 and 37 to be applied to respective subtractors 38, 39 and 40. In the subtractors 38, 39 and 40, the output signal of the third video amplifier 28 is subtracted from the output signals of the respective amplifiers 35, 36 and 37 to provide the three primary color signals. The frequency-limited luminance signal in the output signals of the color difference signal amplifiers 35, 36 and 37 has a polarity opposite to that of the signal appearing at the point 25, that is, the former signal has the same polarity as that of the output signal of the third video amplifier 28. In response to the application of the delayed luminance signal delivered from the third video amplifier 28 and the luminance signal having been subjected to the frequency limitation to about 500 kHz, the subtractors 38, 39 and 40 deliver composite signals consisting of the luminance signals imparted with a preshoot and an overshoot and the chrominance signals representing the three primary colors of red, green and blue. The composite signals are amplified by respective power amplifiers 41, 42 and 43 and are then applied to the cathodes of the respective electron guns in a color picture tube 44 to excite the cathodes.

Figure 6:
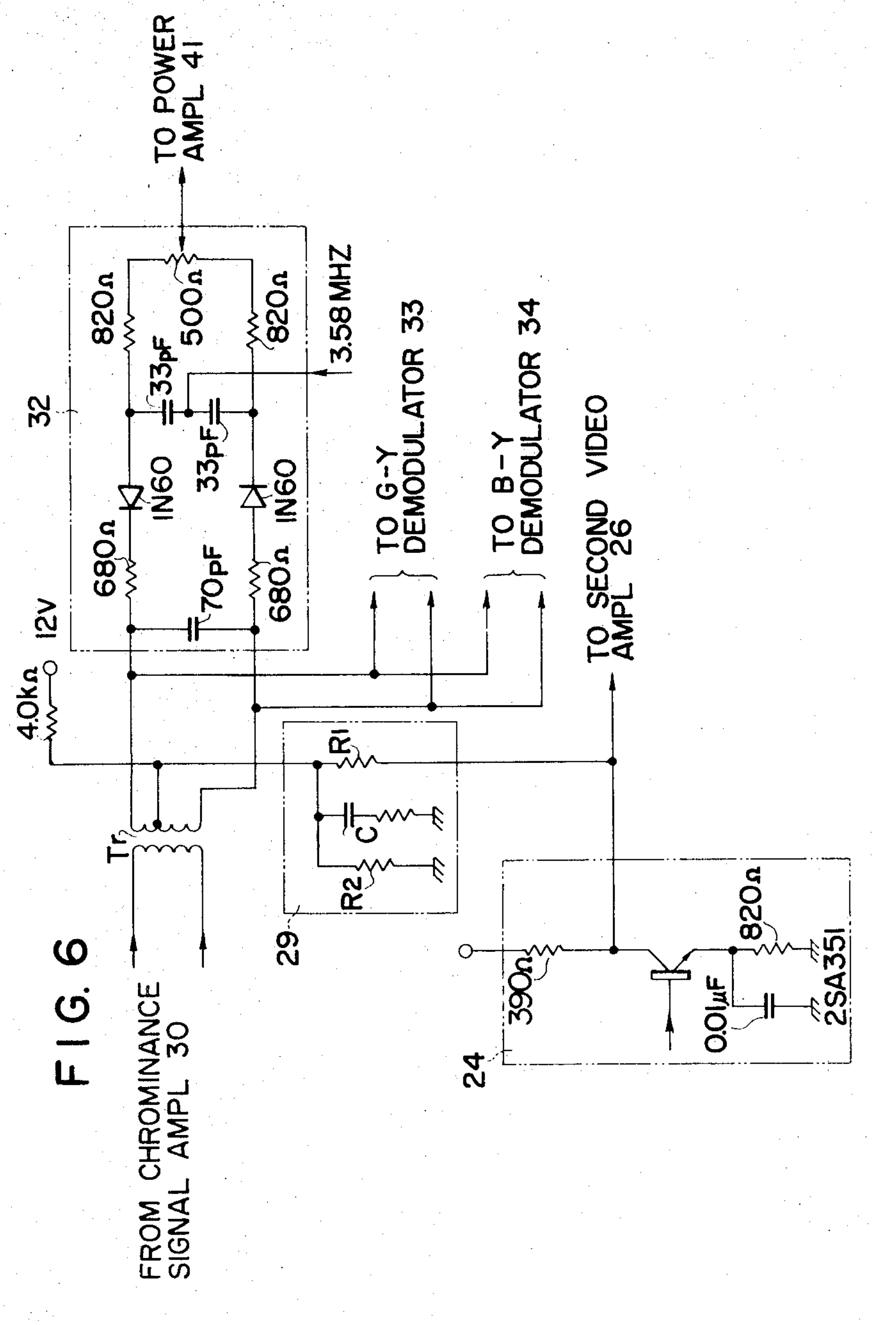
FIG. 6 is a practical circuit diagram of parts of the circuit shown in FIG. 5.

FIG. 6 is a practical circuit diagram of parts of the circuit shown in FIG. 5. The output signal of the first video amplifier 24 is applied through the low-pass filter 29 to a center tap of the secondary winding of a transformer Tr. A capacitor C and resistors $R_1$ and $R_2$ constitute the low-pass filter 29 and are the entirely same as those constituting the low-pass filter 15 shown in FIG. 4. The low-pass filter 29 is so designed that it has a cut-off frequency of about 500 kHz.

It will be apparent from the embodiments described in detail in the above, a simple circuit can impart a preshoot and an overshoot to the luminance signal in a well balanced state and a picture of good quality with an intensified contour can be easily obtained.

Figure 7:
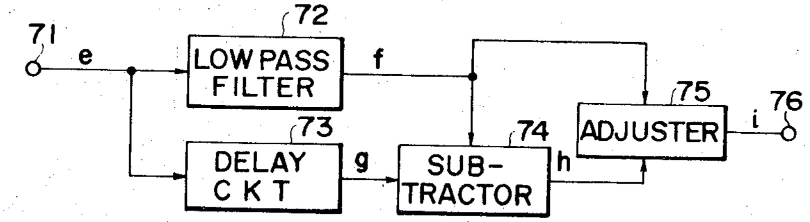
FIG. 7 is a block diagram illustrating another basic structure of the present invention.

FIG. 7 is a block diagram illustrating the basic structure of a further embodiment of the present invention. A sharpness compensating circuit shown in FIG. 7 comprises an input terminal 71, a low-pass filter 72, a delay circuit 73, a subtractor 74, an adjustor 75, and an output terminal 76.

Figure 8:
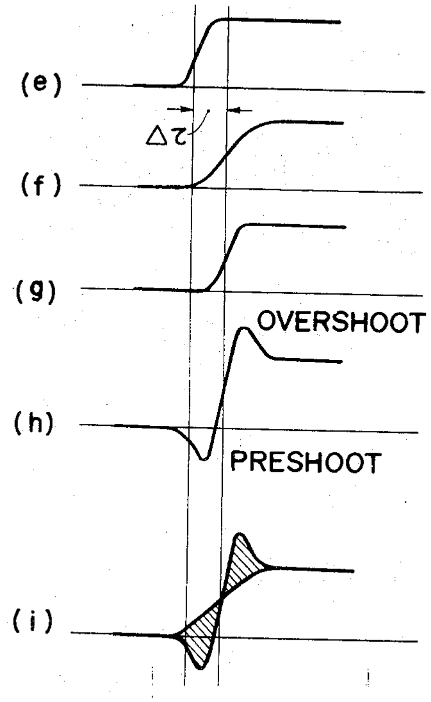
FIGS. 8*e* through 8*i* show voltage waveforms appearing at various parts of the circuit shown in FIG. 7.

The operation of the circuit shown in FIG. 7 will be described with reference to FIGS. 8*e* through 8*i*. The luminance signal having a waveform as shown in FIG. 8*e* is applied to the input terminal 71, thence to both the low-pass filter 72 and the delay circuit 73. The output signal of the low-pass filter 72 has a waveform as shown in FIG. 8f in which it will be seen that the output signal is delayed by $\Delta\tau$ compared with the luminance signal and that the high frequency components of the luminance signal are removed. The output signal of the delay circuit 73 has a waveform as shown in FIG. 8*g* in which it will be seen that the output signal is delayed by $\Delta\tau$ which is substantially equal to the delay time of the low-pass filter 72. The output signal (FIG. 8*f*) of the low-pass filter 72 is applied to both the subtractor 74 and the adjustor 75. In the subtractor 74, the output signal (FIG. 8*f*) of the low-pass filter 72 is subtracted from the output signal (FIG. 8*g*) of the delay circuit 73 after suitably amplifying or attenuating these signals. As a result of subtraction, an output waveform as shown in FIG. 8*h* appears from the subtractor 74 and has a preshoot and an overshoot imparted to the original luminance signal waveform shown in FIG. 8*e*. This output signal (FIG. 8*h*) is applied to the adjustor 75. The adjustor 75 may, for example, be a slide rheostat or a resistor having a plurality of taps. Thus, a waveform as shown in FIG. 8*i* appears at the output terminal 76. It will be seen from FIG. 8*i* that the waveform varies continuously or stepwise between the waveform (FIG. 8*f*) of the output signal of the low-pass filter 72 and the waveform (FIG. 8*h*) of the output signal of the subtractor 74. That is, the output waveform varies within the range of the hatched portions shown in FIG. 8*i*. According to this method, the adjustor 75 may be suitably adjusted to impart a preshoot and an overshoot of any desired magnitude to the luminance signal.

Figure 9:
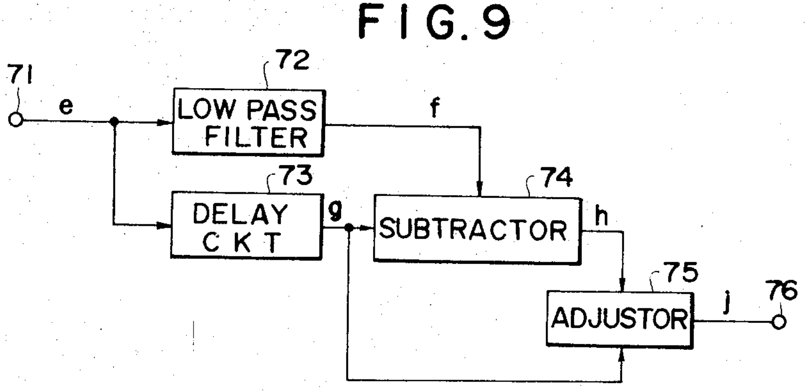
FIG. 9 is a block diagram illustrating a further basic structure of the present invention.
Figure 10:
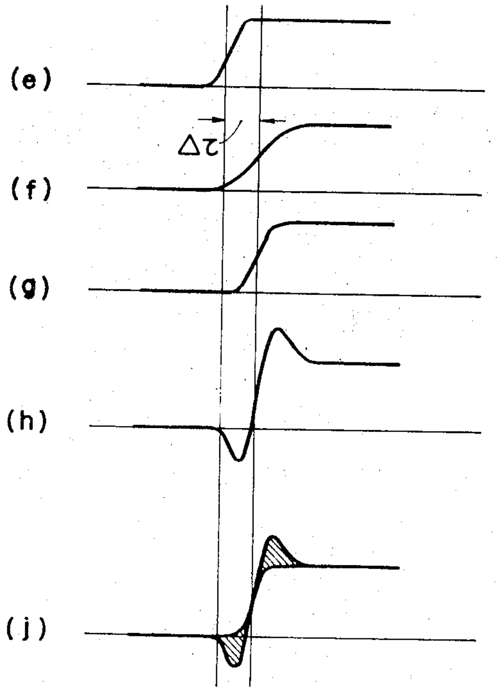
FIGS. 10*e* through 10*h* and 10*i* show voltage waveforms appearing at various parts of the circuit shown in FIG. 9.

FIG. 9 is a block diagram illustrating the basic structure of a yet further embodiment of the present invention. In FIG. 9, like reference numerals are used to denote like parts appearing in FIG. 7. A sharpness compensating circuit shown in FIG. 9 differs from that shown in FIG. 7 in that an output waveform as shown in FIG. 10*g* and an output waveform as shown in FIG. 10*h* are applied respectively from a delay circuit 73 and a subtractor 74 to an adjustor 75 in the former, whereas the output waveform shown in FIG. 8*f* and the output waveform shown in FIG. 8*h* are applied respectively from the lowpass filter 72 and the subtractor 74 to the adjustor 75 in the latter. Thus, in the circuit shown in FIG. 9, an output waveform as shown in FIG. 8*j* appears at the output terminal 76 of the adjustor 75. This output waveform varies within the range of the hatched portions shown in FIG. 10*j* and this range is slightly different from the range shown in FIG. 8*i*. However, both these circuits exhibit the same effect in imparting the preshoot and overshoot to the luminance signal and can equally effectively compensate the sharpness.

Figure 11:
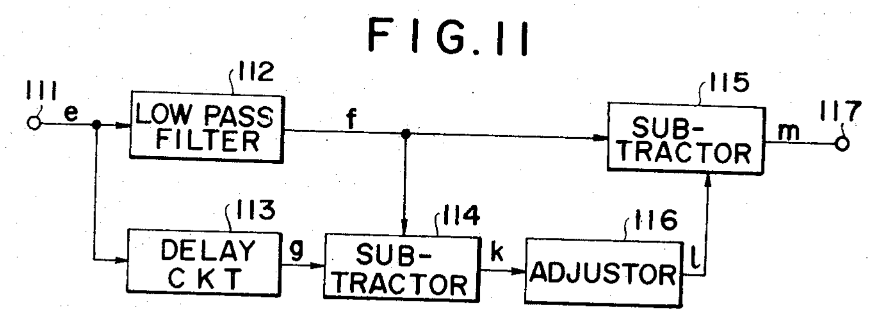
FIG. 11 is a block diagram illustrating a yet further basic structure of the present invention.

FIG. 11 is a block diagram illustrating the basic structure of a still further embodiment of the present invention. A sharpness compensating circuit shown in FIG. 11 comprises an input terminal 111, a low-pass filter 112, a delay circuit 113, subtractors 114 and 115, an adjustor 116, and an output terminal 117.

Figure 12:
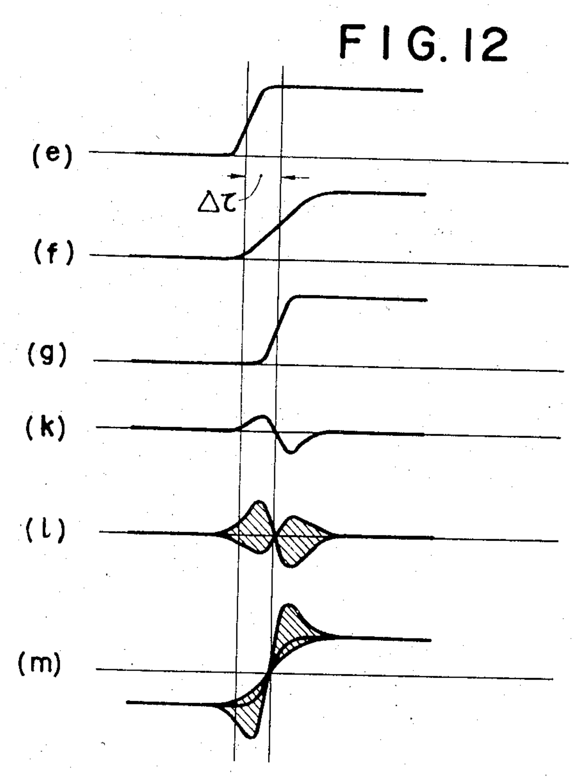
FIGS. 12*e* through 12*g*, and 12*k* through 12*m* show voltage waveforms appearing at various parts of the circuit shown in FIG. 11.

The operation of the circuit shown in FIG. 11 will be described with reference to FIGS. 12*e* through 12*g*, and 12*k* through 12*m*. In this circuit, the low-pass filter 112 and the delay circuit 113 apply their output signals to the subtractor 114 through the entirely same paths as those in the circuit shown in FIG. 7, and any detailed description as to it is unnecessary. In the case of the circuits shown in FIGS. 7 and 9, the output signals of the low-pass filter and the delay circuit are applied to the subtractor to be subjected to subtraction after being amplified or attenuated so that the output signal of the subtractor has a waveform as shown in FIG. 8*h* or 10*h*. In the case of the circuit shown in FIG. 11, however, the low-pass filter 112 and the delay circuit 113 apply the signals of the same level to the subtractor 114 so that the output signal of the subtractor 114 has a waveform as shown in FIG. 12*k*. This output signal (FIG. 12*k*) is applied to the adjustor 116, which controls the gain of or varies the polarity of the signal and delivers an output signal having a waveform as shown in FIG. 12*l*. It will be seen from FIG. 12*l* that the output waveform is variable within the range of the hatched portions. This output signal (FIG. 12*l*) is applied to the subtractor 115 together with the output signal of the low-pass filter 112, and an output signal having a waveform as shown in FIG. 12*m* appears at the output terminal 117. The adjustor 116 may be suitably adjusted to obtain various output waveforms ranging from the waveform, in which the high frequency components are suppressed, to the waveform having a preshoot and an overshoot of any desired magnitude imparted thereto. While the above description has referred to the case of applying the output signals of the low-pass filter 112 and the adjustor 116 to the subtractor 115, the output signals of the delay circuit 113 and the adjustor 116 may be applied to the subtractor 115 to attain the effect similar to that above described.

Figure 13:
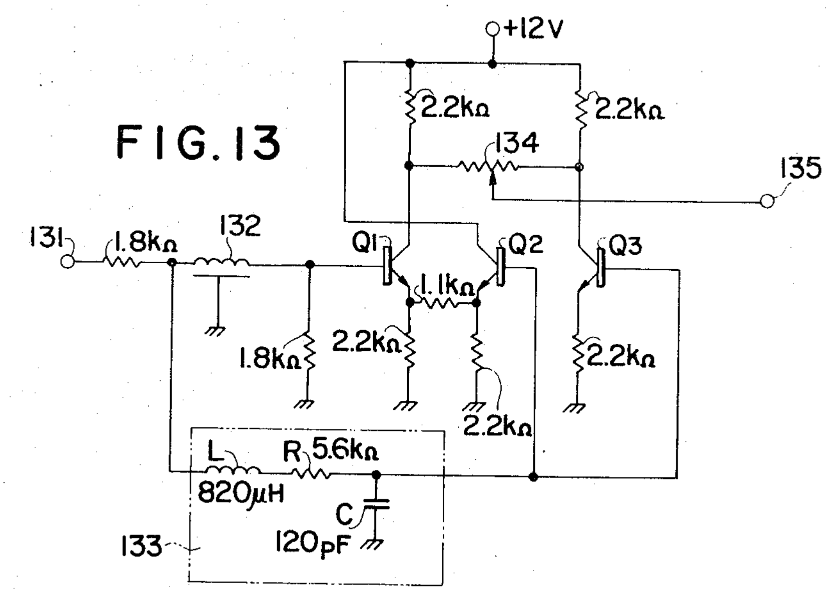
FIGS. 13 through 16 are practical circuit diagrams of the circuits shown in FIGS. 7, 9 and 11.

FIG. 13 is a practical circuit diagram of the embodiment shown by a block diagram in FIG. 7. The luminance signal is applied from, for example, a second video amplifier to an input terminal 131, thence to a delay circuit 132 and to a low-pass filter 133 composed of an inductance coil L, a resistor R and a capacitor C. The delay circuit 132 applies its output signal to the base of a transistor $Q_1$, while the low-pass filter 133 applies its output signal to the base of transistors $Q_2$ and $Q_3$. The transistors $Q_1$ and $Q_2$ constitute a differential amplifier which functions as a subtractor. Thus, the luminance signal appearing at the collector of the transistor $Q_1$ is imparted with a preshoot and an overshoot as described previously. On the other hand, the waveform having been subjected to frequency limitation by the low-pass filter 133 appears at the collector of the transistor $Q_3$. A variable resistor 134 connecting the collector of the transistor $Q_1$ with the collector of the transistor $Q_3$ functions as an adjustor from which an output signal appears at an output terminal 135. More precisely, a waveform having a preshoot and an overshoot of greatest magnitude can be obtained when the output signal is derived from the collector of the transistor $Q_1$, while a waveform free from any preshoot and overshoot can be obtained when the output signal is derived from the collector of the transistor $Q_3$. In lieu of applying the output from the low-pass filter 133 to the base of the transistor $Q_3$, the output from the delay circuit 132 may be applied to the base of the transistor $Q_3$. This latter arrangement provides a practical circuit of the block diagram shown in FIG. 9.

Figure 14:
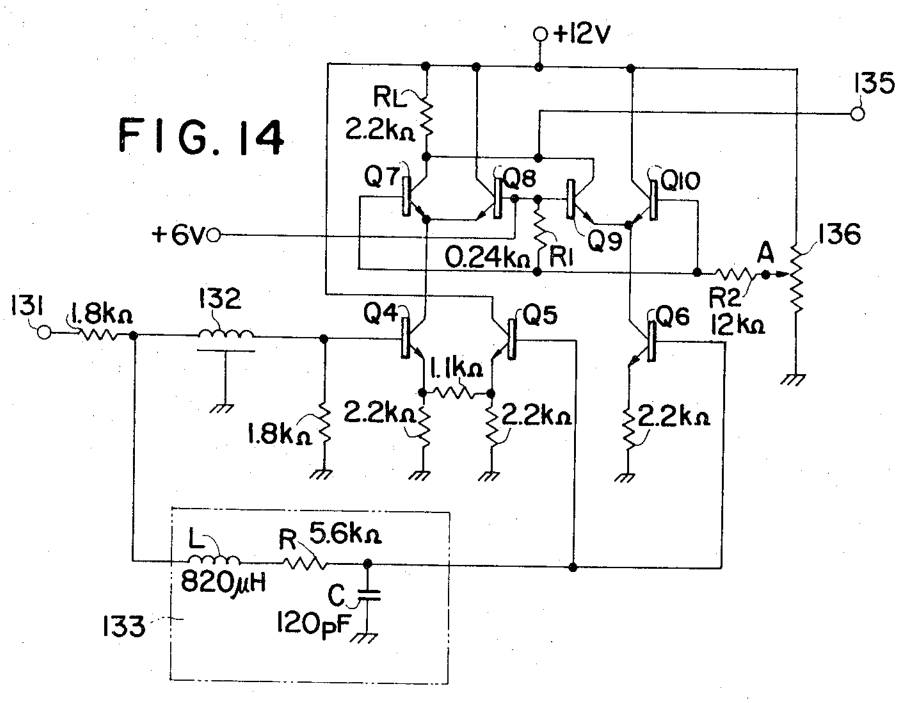

FIG. 14 is a practical circuit diagram of another embodiment of the present invention. The structure shown in FIG. 14 is entirely the same as that shown in FIG. 13 in principle except that a d.c. voltage control circuit is employed in place of the variable resistor 134 in FIG. 13. An output waveform imparted with a preshoot and an overshoot appears at the collector of a transistor Q4, while a waveform having been subjected to frequency limitation appears at the collector of a transistor $Q_6$ as in the case of the embodiment shown in FIG. 13, and therefore any detailed description as to this point is unnecessary.

Transistors $Q_7$, $Q_8$, $Q_9$, $Q_{10}$, resistors $R_1$, $R_2$ and a potentiometer 136 constitute an adjustor. The adjustor operates in a manner as described below. When now the potential at a point A at the output of the potentiometer 136 takes a minimum value or zero volt, the base potential of the transistors $Q_7$ and $Q_{10}$ is sufficiently lower than the base potential of the transistors $Q_8$ and $Q_9$ so that the entire collector current of the transistor $Q_4$ appears as the collector current of the transistor $Q_8$ and the entire collector current of the transistor $Q_6$ appears as the collector current of the transistor $Q_9$. As a result, the collector current of the transistor $Q_6$ solely flows through a common load resistor $R_L$ for the transistors $Q_7$ and $Q_9$, and finally a waveform having been subjected to frequency limitation by a low-pass filter 133 appears at an output terminal 135. On the other hand, when the potential at the output of the potentiometer 136 takes its maximum value or 12 volts, the base potential of the transistors $Q_7$ and $Q_{10}$ is sufficiently higher than the base potential of the transistors $Q_8$ and $Q_9$ so that the entire collector current of the transistor $Q_4$ appears as the collector current of the transistor $Q_7$ and the entire collector current of the transistor $Q_6$ appears as the collector current of the transistor $Q_{10}$. As a result, the collector current of the transistor $Q_4$ solely flows through the load resistor $R_L$ and finally a waveform imparted with a preshoot and an overshoot of greatest magnitude appears at the output terminal 135. It is apparent that a waveform having a preshoot and an overshoot of any desired magnitude can be obtained by suitably varying the potential at the output of the potentiometer 136.

Figure 15:
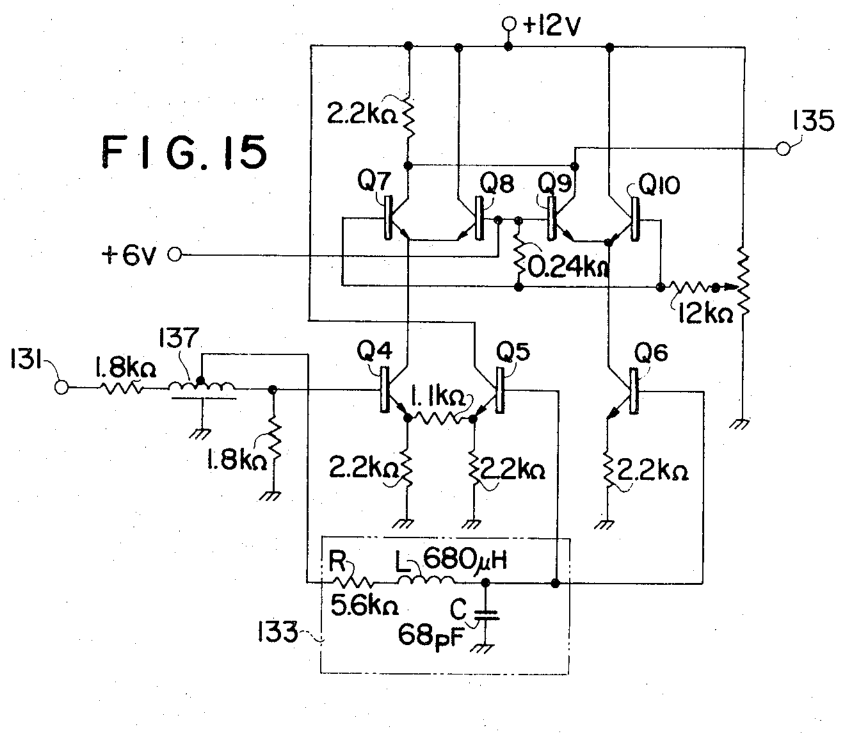

FIG. 15 is a practical circuit diagram of a further embodiment of the present invention and like reference numerals are used therein to denote like parts appearing in FIG. 14. The reference numeral 137 designates a delay circuit. Suppose that a delay line commonly used in a color televilion receiver for substantially equalizing the delay time of the luminance signal transmission path and the chrominance signal transmission path is employed as the delay circuit in the present invention, then a simple low-pass filter is difficult to impart a preshoot and an overshoot of narrow width because the delay time of the delay line is considerably long or of the order of 0.6 to 1.2 $\mu$sec. In this embodiment, therefore, the delay circuit 137 is provided with a center tap which is connected to a simple RLC low-pass filter 133 so as to impart a preshoot and an overshoot of narrow width to the output waveform.

Figure 16:
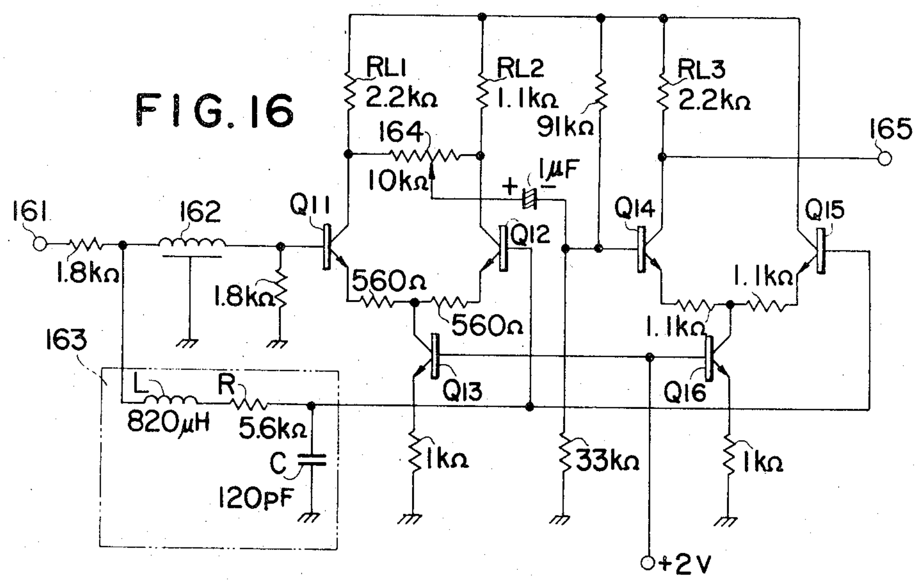

FIG. 16 is a practical circuit diagram of the embodiment shown by a block diagram in FIG. 11. The luminance signal is applied to an input terminal 161 from a second video amplifier. A delay line 162 is connected to the input terminal 161 through a resistor. This delay line 162 is one which is commonly inserted in the luminance signal transmission path so as to equalize the delay time of the luminance signal transmission path and the chrominance signal transmission path. The luminance signal applied to the input terminal 161 is applied to the base of a transistor $Q_{11}$ through the delay line 162, while the luminance signal is applied to the base of a transistor $Q_{12}$ through a low-pass filter 163 composed of an inductance coil L, a resistor R and a capacitor C. Transistors $Q_{11}$, $Q_{12}$ and $Q_{13}$ constitute a differential amplifier so that signals of opposite polarity appear at the collectors of the transistors $Q_{11}$ and $Q_{12}$. A potentiometer 164 is connected between the collectors of the transistors $Q_{11}$ and $Q_{12}$ so as to obtain an output signal of varying magnitude, that is, an output signal whose amplitude and polarity vary within the range of the hatched portions shown in FIG. 12*l*. The potentiometer 164, a collector resistor $R_{L1}$ for the transistor $Q_{11}$ and a collector resistor $R_{L2}$ for the transistor $Q_{12}$ constitute the adjustor 116 shown in FIG. 11. Thus, the variable range of the magnitude of the preshoot and overshoot can be determined by suitably selecting the resistance of these resistors. Transistors $Q_{14}$, $Q_{15}$ and $Q_{16}$ constitute a differential amplifier which corresponds to the subtractor 115 shown in FIG. 11. The output from the potentiometer 164 is applied to the base of the transistor $Q_{14}$, and the output from the low-pass filter 163 is applied to the base of the transistor $Q_{15}$. Thus, by suitably adjusting the potentiometer 164, the luminance signal appearing at an output terminal 165 connected to the collector of the transistor $Q_{14}$ has a continuously variable waveform ranging from a waveform, in which the high frequency components are suppressed, to a waveform which is imparted with a preshoot and an overshoot of any desired magnitude. It is therefore possible to obtain a picture of desired sharpness.

We claim:

1. In a color television receiver including:

a first video amplifier for amplifying a composite color video signal and dividing the composite color video signal into a luminance signal and a chrominance signal;

a luminance signal transmission path including delay means for allowing passage therethrough of the luminance signal applied thereto;

a chrominance signal transmission path for allowing passage therethrough of the chrominance signal applied thereto; and a color picture tube having cathodes and grids, said cathodes and grids being connected to said luminance signal transmission path and chrominance signal transmission path, respectively;

the improvement comprising:

a low pass filter supplied with the luminance signal from said first video amplifier for allowing passage therethrough of only low frequency components of the luminance signal, said low pass filter having a delay time which is substantially equal to that of said delay means;

a substracting means connected between said delay means and said cathodes and supplied with an output signal of said low pass filter for subtracting the output signal of said low pass filter from an output signal of said delay means, whereby the luminance signal appearing at an output of said subtracting means can be imparted with a preshoot and an overshoot to its waveform; and adjusting means provided at the output of said subtracting means and having a pair of inputs and an output for adjusting the magnitude of said preshoot and overshoot, one of said inputs being connected to an output of said low pass filter, the other of said inputs being connected to an output of said subtracting means, and said output being connected to said cathodes.

* * * * *